(12) United States Patent
Lee et al.

(10) Patent No.: US 8,681,141 B2
(45) Date of Patent: Mar. 25, 2014

(54) METHOD FOR CONTROLLING THE POWER OF A DISPLAY BASED ON THE APPROACH OF AN OBJECT DETECTED BY A DETECTION UNIT ON THE SUPPORT STAND

(75) Inventors: Soo-Man Lee, Gyeongbuk (KR); Sea-La Park, Seoul (KR)

(73) Assignee: LG Electronics Inc., Seoul (KR)

( * ) Notice: Subject to any disclaimer, the term of this patent is extended or adjusted under 35 U.S.C. 154(b) by 867 days.

(21) Appl. No.: 12/278,336

(22) PCT Filed: Mar. 20, 2007

(86) PCT No.: PCT/KR2007/001356
§ 371 (c)(1),
(2), (4) Date: Aug. 5, 2008

(87) PCT Pub. No.: WO2007/117086
PCT Pub. Date: Oct. 18, 2007

(65) Prior Publication Data
US 2009/0009506 A1    Jan. 8, 2009

(30) Foreign Application Priority Data
Apr. 11, 2006 (KR) .......................... 10-2006-0032788

(51) Int. Cl.
*G09G 5/00* (2006.01)
*G06F 1/16* (2006.01)

(52) U.S. Cl.
USPC ........................ 345/211; 345/207; 361/679.21

(58) Field of Classification Search
USPC ................ 345/204–215; 361/679.02–679.61; 250/221
See application file for complete search history.

(56) References Cited

U.S. PATENT DOCUMENTS

| | | | | |
|---|---|---|---|---|
| 5,077,467 A | * | 12/1991 | Barron et al. | 250/221 |
| 5,186,360 A | * | 2/1993 | Mease et al. | 222/63 |
| 5,459,944 A | * | 10/1995 | Tatsutani et al. | 34/202 |
| 5,627,974 A | * | 5/1997 | Watts et al. | 710/304 |
| 5,835,083 A | * | 11/1998 | Nielsen et al. | 345/211 |
| 5,917,479 A | * | 6/1999 | Haapakoski | 345/211 |
| 5,948,074 A | * | 9/1999 | Ninomiya | 710/2 |
| 6,054,981 A | * | 4/2000 | Kimoto et al. | 345/211 |

(Continued)

FOREIGN PATENT DOCUMENTS

| | | |
|---|---|---|
| CN | 2690990 Y | 4/2005 |
| EP | 0 810 512 A1 | 12/1997 |

(Continued)

OTHER PUBLICATIONS

European Search Report dated Dec. 27,2, 2010 issued in Application No. 07 715 730.3.

(Continued)

*Primary Examiner* — Chanh Nguyen
*Assistant Examiner* — Navin Lingaraju
(74) *Attorney, Agent, or Firm* — KED & Associates LLP (57) ABSTRACT

A display system is provided. The display system includes a display unit for displaying an image, a support stand for supporting the display unit, a power source unit for supplying power to the display unit, an approaching detection unit that is formed on the support stand to detect an approach of an object, and a control unit for controlling the power source unit by recognizing a predetermined command corresponding to a detection signal from the approaching detection unit.

23 Claims, 5 Drawing Sheets

(56) References Cited

U.S. PATENT DOCUMENTS

| | | | |
|---|---|---|---|
| 6,374,145 B1 | 4/2002 | Lignoul | 700/17 |
| 6,518,561 B1 | 2/2003 | Miura | 250/221 |
| 7,463,163 B2* | 12/2008 | Wu | 340/815.45 |
| 2002/0003206 A1* | 1/2002 | Culver | 250/221 |
| 2003/0140535 A1* | 7/2003 | Knoerzer et al. | 40/544 |
| 2003/0190949 A1 | 10/2003 | Williams | 463/24 |
| 2004/0021460 A1* | 2/2004 | Ohtsuki | 324/207.26 |
| 2004/0051813 A1 | 3/2004 | Marmaropoulos | 348/553 |
| 2004/0061997 A1* | 4/2004 | Skinner | 361/683 |
| 2004/0222977 A1* | 11/2004 | Bear et al. | 345/184 |
| 2004/0222978 A1* | 11/2004 | Bear et al. | 345/184 |
| 2005/0071698 A1 | 3/2005 | Kangas | 713/300 |
| 2005/0247863 A1* | 11/2005 | Kaessner | 250/221 |
| 2005/0257145 A1* | 11/2005 | Gage | 715/530 |
| 2005/0264987 A1* | 12/2005 | Krancher et al. | 361/683 |
| 2010/0066765 A1* | 3/2010 | Lee | 345/690 |

FOREIGN PATENT DOCUMENTS

| | | |
|---|---|---|
| GB | 2 384 610 A | 7/2003 |
| JP | 2000-242255 | 9/2000 |
| JP | 2001-055852 A | 2/2001 |
| JP | 2001-134256 | 5/2001 |
| JP | 2004-24933 A | 1/2004 |
| KR | 10-2006-0027686 A | 3/2006 |

OTHER PUBLICATIONS

Chinese Office Action dated Mar. 24, 2010 for Application No. 200780007947.3.

European Search Report dated Jul. 12, 2010 issued in Application No. 07 71 5730.

International Search Report dated Jul. 5, 2007.

\* cited by examiner

METHOD FOR CONTROLLING THE POWER OF A DISPLAY BASED ON THE APPROACH OF AN OBJECT DETECTED BY A DETECTION UNIT ON THE SUPPORT STAND

TECHNICAL FIELD

The present invention relates to a display system for displaying an image.

BACKGROUND ART

A conventional display system displays an image on a display module such as a cathode ray tube (CRT), a liquid crystal panel, electro-luminescence panel, and a plasma display panel. To this end, the display system includes a driving device that operates in response to video data or video signals from a video information source. The driving device of the display system drives the display module in response to the video signals or the video data.

In the display device, a key-switch is used to allow a user to input a power-on command or a power-off command. The key-switch is classified into a pressing type, a touch type, and a conversion type. These types of the key-switches are activated only when a portion of a human body contacts them.

Therefore, when the user intends to turn on or off the display system, he/she should accurately presses, touches, or converts the key-switch installed at a predetermined location. This is troublesome for the user.

DISCLOSURE OF INVENTION

Technical Problem

An object of the present invention is to provide a display system that is designed to control power in response to a power control command from a user even when the user without contacting the user, and a method of controlling the power of the display system.

Another object of the present invention is to provide a display system whose operation is conveniently controlled, and a method of controlling the power of the display system.

Technical Solution

In an aspect of the present invention, there is provided a display system including: a display unit for displaying an image; a support stand for supporting the display unit; a power source unit for supplying power to the display unit; an approaching detection unit that is formed on the support stand to detect an approach of an object; and a control unit for controlling the power source unit by recognizing a predetermined command corresponding to a detection signal from the approaching detection unit.

In another aspect of the present invention, there is provided a method of controlling a power of a display system, the method including generating a signal when an object approaches; recognizing a predetermined command corresponding to the generated signal; and controlling a power source unit for supplying a driving voltage to a display unit in accordance with the recognized command.

In still another aspect of the present invention, there is provided a method of controlling a power of a display system, the method including: recognizing a power-on/off command as an object approaches; controlling a power source unit for supplying a driving voltage to a display unit in accordance with the recognized power-on/off command; and controlling a light emitting pattern of a light emission unit in accordance with the recognized power-on/off command.

In still yet another aspect of the present invention, there is provided a display system including: a display unit for displaying an image; a support stand for supporting the display unit; a power source unit for supplying power to the display unit; an approaching detection unit that is formed on the support stand to detect an approach of an object; and a control unit for controlling the power source unit by recognizing a pre-determined command corresponding to a detection signal from the approaching detection unit, wherein the object is a part of a human body.

Advantageous Effects

According to the display system of the present invention, the user can accurately input the power-on/off command using a not-contact manner. In addition, an error notification on a wrong power-on/off command input operation can be effectively transmitted to the user using a light emission pattern of a light emission unit.

In addition, the user's manipulation intension can be accurately transmitted without any error.

BEST MODE FOR CARRYING OUT THE INVENTION

Hereinafter, exemplary embodiments of the present invention will be described in detail with reference to the accompanying drawings.

Figure 1:
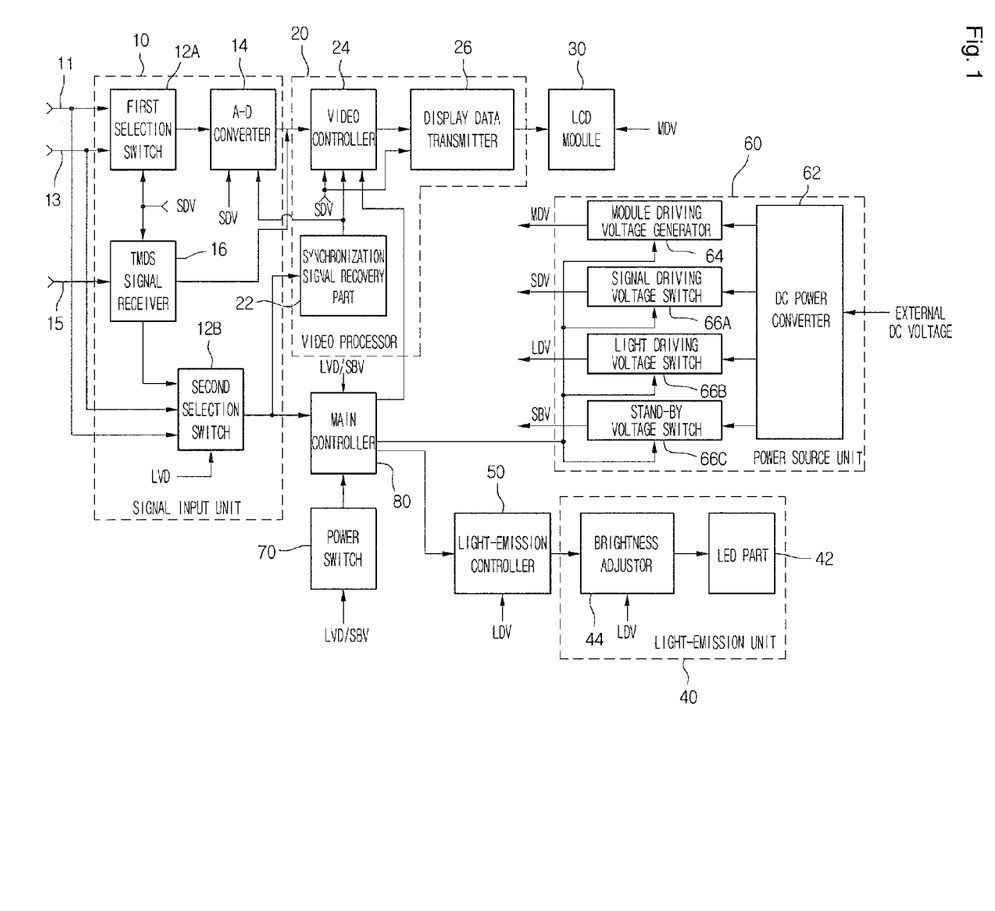
FIG. 1 is a block diagram of a display system according to an embodiment of the present invention.

FIG. 1 is a block diagram of a display system having a power control function according to an embodiment of the present invention.

In the following description of embodiments, an operating mode of a display system is generally divided into a power-on mode and a power-off mode. The power-on mode includes only a signal input mode that includes a normal mode and a power-saving mode (or a display power management (DPM) mode), or may include even a start mode. In other words, the power-on mode can include only the signal input mode or include both the start mode and the signal input mode. When the power-on mode includes the start mode, a display system enters a normal mode after performing the start mode. The start mode, the normal mode, the power-saving mode, the power-off mode, and the power-on mode will be clearly understood through the following description of embodiments associated with the accompanying drawings.

FIG. 1 is a block diagram of a display system according to an embodiment of the present invention.

Referring to FIG. 1, the display system includes a signal input unit, a signal process unit 20, and an LCD module, all of which are connected to first through third video information sources (not shown) (e.g., a television signal receiving unit, a graphic board of a computer system, or the like).

The signal input unit 10 may be connected to the first through third vide information sources through respective first through third input lines 11, 13, and 15.

Analog color signals (hereinafter, referred to as "normal color signals") and synchronizing signals (hereinafter, referred to as "normal synchronizing signals) may be input from the first second video information source to the first input line 11.

Color signals converted into analog signal formats (hereinafter, referred to as "DA conversion color signals") and synchronizing signals (hereinafter, referred to as "DA conversion synchronizing signals") may be input from the second video information source to the second input line 13.

Color data and synchronizing signals that are encoded into a transition minimized differential signaling (hereinafter, referred to as "TMDS") signal formats may be input from the third information source to the third input line 13.

The signal input unit 10 selectively transmits the color signals and synchronizing signals input to the first and second input lines 11 and 13 and the color data and synchronizing signals input to the third input line 15 to the signal processor 20.

At this point, the color signals input to the first and second input lines 11 and 13 are transmitted to the signal processor 20 in a state where they are converted into digital data formats. In order to selectively transmit the video information, the signal input unit 10 includes a first selection switch 12A connected to the first and second input lines 11 and 13, and an analog-to-digital (hereinafter, referred to as A-D converter) 14. The first selection switch 12A selects ones of color signals input to the first input line 11 and the DA conversion color signals input to the second input line 13 and transmits the selected ones to the A-D converter 14. The color selection operation of the first selection switch 12A is controlled by a main controller that will be described below. The A-D converter 14 converts the color signals from the first selection switch 12A into the digital data formats and transmits the converted color data to the signal processor 20.

The signal input unit 10 further includes a TDMS signal receiver 15 connected to the third input line 15 and a second selection switch 12B connected to the TDMS signal receiver 16.

The TDMS signal receiver 16 receives the TDMS signals from the third video information source through the third input line 15 and decodes the color data and the synchronization signals from the received TDMS signals. The decoded color data are transmitted to the signal processor 20 while the decoded synchronization signals are transmitted to the second selection switch 12B.

The second selection switch 12B inputs, in addition to the decoded synchronization signals from the TDMS signal receiver 16, the normal synchronization signals input to the first input line 11 and the D-A conversion synchronization signals input to the second input line 13 to the signal processor 20. The second selection switch 12B selects ones of three different types of synchronization signals and transmits the selected synchronization signals to the signal processor 20. The synchronization signal selection operation of the second selection switch 12B is also controlled by the main controller 80.

Also, the signal processor 20 converts color data input simultaneously with synchronization signals from the signal input unit 10 into a format required by the LCD module 30, and transmits the converted color data together with the synchronization signals to the LCD module 30. To realize this, the signal processor 20 includes a video controller 14 commonly connected to both of the A-D converter and the TDMS signal receiver 16 and a synchronization signal recovery unit 22 connected to the second selection switch 12B. The synchronization signal recovery unit 22 recovers a frequency and waveform of synchronization signals selected by the second selection switch 12B to the initial frequency and waveform. To realize this, the synchronization signal recovery unit 22 includes a phase locked loop.

Also, synchronization signals recovered by the synchronization signal recovery unit 22 include a pixel clock, horizontal synchronization signals, vertical synchronization signals, or may include only a pixel clock and horizontal synchronization signals. These recovered synchronization signals are provided to the AD converter 14 and the video controller 24. On the other hand, the AD converter 14 may receive only a pixel clock among the recovered synchronization signals. The pixel clock controls a conversion period of the AD converter 14. The video controller 24 converts the color data from the AD converter 14 or the color data from the TMDS signal receiver 16 into formats required by the LCD module 30 using synchronization signals recovered by the synchronization signal recovery part 22. Also, color data whose format has been converted by the video controller 24 are transmitted to the LCD module 30 together with synchronization signals and data enable signals via the display data transmitter 26. The display data transmitter 26 allows the color data from the video controller 24, the synchronization signals, and the data enable signals to be encoded in a pre-determined signal type (e.g., low voltage differential signaling) and transmitted to the LCD module 30.

The LCD module 30 receives the color data and synchronization signals transmitted via the display data transmitter 26 and drives pixels in response to the color data by synchronizing with synchronization signals to thereby display an image. Although the LCD module 30 has been described as the display module of the display system by way of example, it would be obvious to a person of an ordinary skill in the art that the LCD module 30 can be replaced by one of a cathode ray tube (CRT), a plasma display module, an electro-luminance display module, etc.

The signal input unit 1—, the signal processor 20, and the LCD module 30 constitutes a display unit. The display unit operates in the normal mode or the power-saving mode (i.e., display power management (DPM) mode) depending on whether the synchronization signal and/or the color signal (or color data) are input from the first to third input lines 11, 13, and 15.

The normal mode means an operating mode of a display system that operates the display unit in the event that both the synchronization signal and the color signal (or color data) are input to the input lines. The power-saving mode means an operating mode of a display system that does not operate the display unit in the event that any one of the synchronization signal and the color signal (or color data) is not input to the first to third input lines 11, 13, and 15.

The display system of this exemplary embodiment of the present invention further includes a light emission controller 50 for controlling the light emission unit 40. The light emission unit 40 includes an LED unit 42 including at least tow LEDs and a brightness adjustor 44 connected between the light emission controller 50 and the LED unit 42.

The light emission unit 40 may include an array of LEDs that function to let the user know the current operating mode of the display system.

The LED unit 42 having the LEDs may be replaced with other light source (e.g., a cold cathode fluorescent lamp or a white rightness adjustor 44 adjusts a current amount or a voltage level of a driving signal provided to at least two LEDs included in an LED unit 42 to an amount and a level designated by the user, thereby adjusting brightness of the LEDs. For this purpose, the brightness adjustor 44 includes a switch (e.g., a key switch, a touch switch, or a glow lamp). The brightness adjustor 44 adjusts a current amount or a voltage level of a driving signal input to at least two LEDs included in the LED unit 42 to an amount and a level set by the user, thereby adjusting brightness of the LEDs. For this purpose, the brightness adjustor 44 includes a switch (e.g., a key switch, a touch switch, or an access detection switch) for receiving a brightness level command from the user. The brightness adjustor 44 may be realized using a program operated by a processor (e.g., a central processing unit (CPU) or a microcomputer) having an operation function. In the event that the brightness adjustor 44 is realized using the program, a switch unit of the brightness adjustor 44 can be connected to the light emission controller 50 or a main controller 80.

Therefore, the light emission controller 50 individually controls the at least two LEDs of the LED unit 42 connected via the brightness adjustor 44 to allow the at least two LEDs to emit light in various patterns, so that the user can easily recognize a current operating mode of the display system through such various light emission patterns of the LEDs, as a result of which the reliability of the display system is improved. In addition, the various light emission patterns provides a cozy, comfortable environment and thus the user gets peace of mind.

To explain the light emission patterns of the LEDs included in the LED unit 42, it is assumed that the operating mode of the display system is divided into the power-on mode including the start mode, the normal mode, and the power-saving mode, and the power-off mode. Also, it can be assumed that the operating mode of the display system is divided into the power-on mode including only the signal input mode divided into the normal mode and the power-saving mode, and the power-off mode. In other words, it is assumed that the operating mode is divided into a start mode that allows power to be supplied to all circuits of the display system in response to a power-on command, and the power-off mode that allows power supplied to other circuits that exclude a control circuit of a display system to be cut off in response to a power-off command besides the normal mode according to the inputting of a video signal and the DPM mode. In addition, an operating mode of a display system sequentially changing from a start mode to the normal mode, the power-saving mode, and to the power-off mode is assumed and an operating mode of a display system sequentially changing from the normal mode to the power-saving mode and the power-off mode is assumed.

Figure 2:
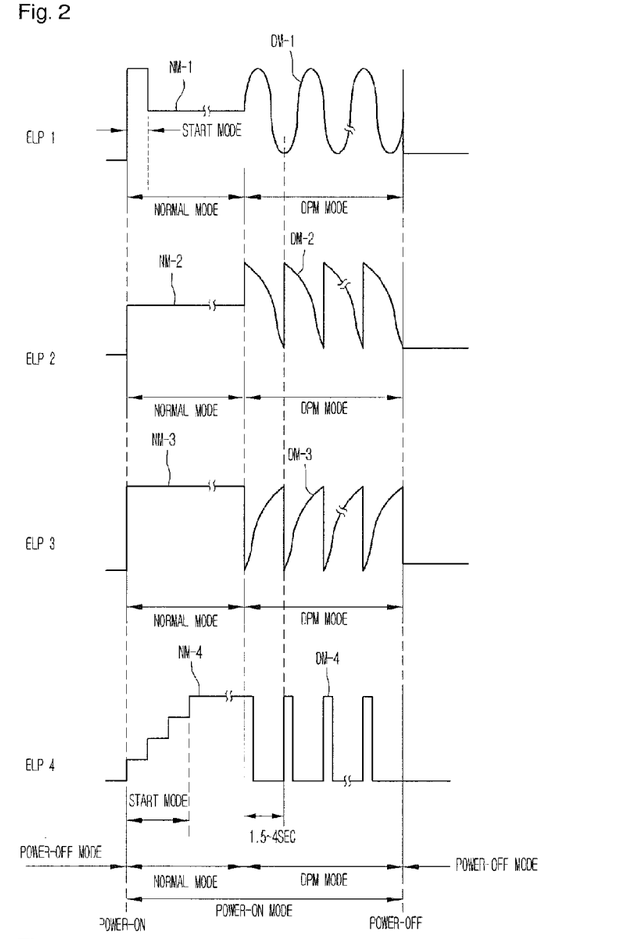
FIG. 2 is a waveform diagram explaining sequential light-emitting part of the LED unit illustrated in FIG. 1.

First, when the operating mode of the display system sequentially changes from a start mode up to the power-off mode, the light emission controller 50 sequentially responses light emission mode commands from the main controller 80 to allow the LED unit 42 within the light emission unit 40 to emit light in an order shown in patterns of a first or fourth sequential light emitting pattern ELP1 or ELP4 of FIG. 2.

That is, referring to the first sequential light emitting pattern ELP1 and the fourth sequential light emitting pattern ELP4, a light emission pattern informing the user of a start mode is included in a starting section of a light emission pattern (NM-1, NM-4) informing the user of the normal mode.

To allow the LED unit 42 to emit light according to light-emitting patterns having an order illustrated in the first sequential light emitting pattern ELP1, the light emission controller 50 supplies a pulse width modulation (PWM) signal (a maximum amount of current signal or a maximum level of voltage signal) having a maximum impulse coefficient for a predetermined period starting from a time at which a power-on command is input to the LED unit 42, and lowers an impulse coefficient of the PWM signal to an arbitrary intermediate value lower than a maximum value to allow an ELP of a brightest operating mode and an ELP of the normal mode that is weakened to a predetermined intermediate level to sequentially appear.

In this case, after emitting light at maximum brightness, the LEDs within the LED unit 42 emit light at an intermediate level until an operating mode of the display system changes into the power-saving mode. That is, the display system operates for a predetermined period in a start mode at an instant a power-on command is input, and lets the user know that a current mode is the normal mode.

When a current operating mode of the display system changes to the power-saving mode, the light emission controller 50 supplies a PWM signal (or a current signal or a voltage signal) to at least two LEDs within the LED unit 42 included in the light emission unit 40. At this point, the PWM signal is repeated in the form where an impulse coefficient of the PWM signal gradually reduces during a predetermined section from a maximum value to a minimum value (i.e., zero) and then gradually increases during a predetermined section from a minimum value (i.e., zero) to a maximum value. With such a construction, the LEDs within the LED unit 42 repeated to emit light at brightness that gradually reduces from a maximum level to a minimum level and emit light at brightness that gradually increases from a minimum level to a maximum level as shown in the first DLP pattern (DM-1) in the first sequential light emitting pattern ELP1 of FIG. 2. In other words, the LEDs perform a periodic light emission where brightness gradually increases from a minimum level to a maximum level and gradually reduces to the minimum level again. Such light emitting patterns where the fade-in and fade-out of brightness are repeated allow the user to recognize that the display system operates in the power-saving mode (i.e., a DPM mode). A period where the fade-in and the fade-out of brightness are repeated is set to range from 1.5 seconds to 4 seconds for which the user can experience stability, comfortableness, and pleasant feeling. When the user inputs a power-off command, the light emission controller 50 cuts off a PWM signal (or a current signal or a voltage signal) supplied to the LED unit 42 to turn off the LEDs of the LED unit 42.

In order to allow the LED unit 42 to emit light according to light-emitting patterns having an order illustrated in the first sequential light emitting pattern ELP1, the light emission controller 50 supplies a pulse width modulation (PWM) signal (a current signal that gradually increases from zero to a maximum value or a voltage signal that gradually increases from zero to a maximum level) having a maximum impulse coefficient that gradually increases from zero to a maximum value from a time at which a power-on command is input, to the LEDs of the LED unit 42, to allow the LEDs to emit light in patterns where brightness gradually increases from a light-out state to a maximum level as in the ELP4 of FIG. 2. Brightness that gradually increases from the light-out state to the maximum level allows the user to recognize a start mode in which the display system starts to display an image. The light emission controller 50 supplies a PWM signal having a maximum impulse coefficient (or a maximum amount of a current signal or a maximum level of a voltage signal) to the LEDs within the LED unit 42 included in the light emission unit 40 to allow the LEDs within the LED unit 42 to emit light at maximum level brightness as shown in the fourth normal pattern (NM-4) in the fourth sequential light emitting pattern ELP4 of FIG. 2. Also, a light emitting pattern of the LEDs where the LEDs within the LED unit 42 emit light at the maximum level brightness allows the user to recognize that the display system operates in the normal mode where an image is normally displayed. The light emitting pattern of the LEDs representing the normal mode is maintained until an operating mode of the display system changes to the power-saving mode. When the operating mode of the display system changes to the power-saving mode, the light emission controller 50 supplies a PWM signal (or a current signal or a voltage signal) whose impulse coefficient has a maximum value to the LEDs within the LED unit 42 every relatively long period. Accordingly, the LEDs within the LED unit 42 emit light one time every relatively long period as in the fourth DPM pattern (DM-4) of the fourth sequential light emitting pattern ELP4 illustrated in FIG. 2. In other words, the light emission controller 50 allows the LEDs to emit light in a relatively slow flickering manner. The slow flickering light emitting pattern of the LEDs allows the user to recognize that the display system operates in the power-saving mode (i.e., a DPM mode). Also, a flickering period of the LEDs is set to range from about 1.5 seconds to about 4 seconds for which the user can experience stability, comfortableness, and pleasant feeling. It is desirable to set the flickering period of the LEDs to a range of about 2-3 seconds close to a human breathing period. The light emitting pattern of the power-saving mode is maintained until the power-off command is input. When the power-off command is input, the light emission controller 50 cut off a PWM signal (or a current signal or a voltage signal) supplied to the LED unit 42 to turn off the LEDs of the LED unit 42.

Next, when an operating mode of the display system sequentially changes from the normal mode to the power-off mode, the light emission controller 50 sequentially responses to light emission commands from the main controller 80 to control the LED unit 42 within the light emission unit 40 to emit light according to light emitting patterns shown in an order of the second sequential light emitting pattern ELP2 or the third sequential light emitting pattern ELP3 illustrated in FIG. 2.

Referring to the light emitting patterns ELP2 and ELP3, it can be noted that light emitting patterns (NM-2 and NM-3) informing the user of a normal do not include a light emitting pattern informing the user of a start mode.

To allow the LED unit 42 to emit light according to light-emitting patterns having an order illustrated in the second sequential light emitting pattern ELP2, the light emission controller 50 supplies a pulse width modulation (PWM) signal (a current signal or a voltage signal) having a predetermined intermediate impulse coefficient lower than a maximum value from a time point at which a power-on command is input, to the LEDs of the LED unit 42 to allow the LEDs to emit light in patterns of the normal mode where the LEDs emit light at brightness of a predetermined intermediate level. The patterns of the normal mode are maintained until the operating mode of the display system changes to the power-saving mode. When the operating mode of the display system changes to the power-saving mode, the light emission controller 50 supplies a PWM signal (or a current signal or a voltage signal) to the LEDs within the LED unit 42 included in the light emission unit 40. At this point, the impulse coefficient of the PWM signal repeats to gradually change from a maximum value to a minimum value (i.e., zero). Then, the LEDs repeat to emit light at brightness that gradually reduces from a maximum level to a minimum level shown in the second DLP pattern (DM-2) of the second sequential light emitting pattern ELP2 of FIG. 2. In other words, the LEDs emit light in patterns where brightness of the LEDs gradually reduces from maximum brightness to a light-out state. The light emitting pattern where fade-out of brightness repeats allows the user to recognize that the display system operates in the power-saving mode (i.e., the DPM mode).

Also, a period where the fade-in and the fade-out of brightness are repeated is set to within about 1.5-4 seconds, which the user can experience stability, comfortableness, and pleasant feeling. A light emitting pattern of the LED unit 42 where the fade-in and fade-out of brightness are repeated is maintained until the power-off command is input.

When the power-off command is input, the light emission controller 50 cuts off the PWM signal (or a current signal or a voltage signal) supplied to the LED unit 42 to turn off the LEDs of the LED unit 42.

In order to allow the LED unit 42 to emit light according to light-emitting patterns having an order illustrated in the third sequential light emitting pattern ELP3, the light emission controller 50 supplies a PWM signal (a current signal or a voltage signal), which has an impulse coefficient of a maximum value from a time point at which a power-on command is input, to the LEDs of the LED unit 42 to thereby allow the LEDs to emit light in patterns of the normal mode where the LEDs emit light at maximum brightness. The patterns of the normal mode where the LEDs emit light at maximum brightness are maintained until the current operating mode of the display system changes to the power-saving mode. When the current operating mode of the display system changes to the power-saving mode, the light emission controller 50 supplies a PWM signal (or a current signal or a voltage signal) to the LEDs within the LED unit 42 included in the light emission unit 40. At this point, an impulse coefficient of the PWM signal repeats to gradually change from a minimum value (i.e., zero) to a maximum value. Then, the LEDs repeat to emit light at brightness that gradually reduces from a minimum level to a maximum level shown in the third DLP pattern (DM-3) of the third sequential light emitting pattern ELP3 of FIG. 2. In other words, the LEDs emit light in patterns where brightness of the LEDs gradually increases from minimum brightness to maximum brightness. The light emitting pattern where fade-in of brightness repeats allows the user to recognize that the display system operates in the power-saving mode (i.e., the DPM mode). Also, a period where the fade-in of brightness is repeated is set to within about 1.5-4 seconds, which the user can experience stability, comfortableness, and pleasant feeling. The light emitting pattern of the LED unit 42 where the fade-in of brightness is repeated is maintained until the power-saving mode is released or a power-off command is input. When the user inputs a power-off command, the light emission controller 50 cuts off a PWM signal (or a current signal or a voltage signal) supplied to the LED unit 42 to turn off the LEDs of the LED unit 42.

Though four sequential light emitting patterns of the LEDs within the LED unit 42 according to the operating modes of the display system have been described as illustrated in FIG. 2, it would be obvious to a person of an ordinary skill in the art that these light emitting patterns are merely exemplary and combination of the light emitting patterns of the LEDs according to a current operating mode of the display system can be realized in various patterns different from those illustrated in FIG. 7.

To allow the LEDs within the LED unit 42 to emit light in various patterns, the light emission controller 50 may include a processor (i.e., a central process unit or micro-computer) having an operation function. Also, the light emission controller 50 including the processor can realize the brightness adjustor 44 using a program. In this case, the light emission controller 50 can include a switch element included in the brightness adjustor 44.

Referring again to FIG. 1, the display system includes the power source unit 60 for supplying a voltage required for driving the system. The power source unit 60 selectively supplies driving voltages to the signal input unit 10, the signal processor 20, the LCD module 30, and the light emission unit 40 according to a current operating mode of the display system. When the display system operates in one of the power-on mode and the normal mode, the power source unit 60 supplies driving voltages to all circuits within the system. On the other hand, when the display system operates in the power-saving mode (i.e., a DPM mode), the power source unit 60 cuts off the driving voltages (i.e., an MDV and SDV) supplied to the LCD module 30, the signal processor 20, the first selection switch 12A, the AD converter 14, and the TMDS signal receiver 16 within the signal input unit 10. However, during the power-saving mode, power can be additionally supplied to some of circuits while power supplied to a display module such as the LCD module is cut off. On the other hand, during the power-saving mode, a light driving voltage (LDV) is supplied to the second selection switch 12B, the main controller 80, the light emission unit 80, and the light emission controller 50. Last, when the display system operates in the power-off mode (i.e., a standby mode), driving voltages MDV, SDV, and LDV supplied to the rest circuits that exclude the main controller 80 and the non-contact key input unit 70 are cut off. In this case, since a standby voltage (SBV) having a lowest level is supplied to only the main controller 80 and the non-contact key input unit 70, a power cut-off operation selectively performed by the power source unit 60 is controlled by the main controller 80.

To perform the selective power cut-off operation, the power source unit 60 includes the DC power converter 62 for receiving an external DC voltage, the module driving voltage generator 64, the signal driving voltage switch 66A, the light driving voltage switch 66B, and the stand-by switch 66C connected to the DC power converter 62. The DC power converter 62 generates a module voltage, a signal driving voltage (SDV), a light driving voltage (LDV), and a standby voltage (SBV) from the external DC voltage.

The module driving voltage generator 64 generates the MDV required for driving the LCD module 30 using the module voltage from the DC power converter 62. The module driving voltage generator 64 includes an inverter circuit in order to generate the MDV. When the LCD module 30 is replaced by other display module, the module driving voltage generator 64 may not include the inverter circuit. Only when the display system operates in one of a start mode and the normal mode, the MDV is generated by the module driving voltage generator 64 and supplied to the LCD module 30, so that an operation of generating the MDV by the module driving voltage generator 64 is controlled by the main controller 80.

The signal driving voltage switch 66A selectively cuts off SDVs that are to be supplied from the DC power converter 62 to the synchronization signal recovery part 22, the video controller 24, the display data transmitter 26, the first selection switch 12A, the AD converter 14, and the TMDS signal receiver 16 depending on an operating mode of the display system. The signal driving voltage switch 66A allows the SDV to be supplied to the synchronization signal recovery part 22, the video controller 24, the display data transmitter 26, the first selection switch 12A, the AD converter 14, and the TMDS signal receiver 16 when the display system operates in a start mode and/or the normal mode. On the other hand, when the display system operates in one of the power-off mode and the power-saving mode (i.e., a DPM mode), the signal driving voltage switch 66A does allow the SDV not to be supplied to the synchronization signal recovery part 22, the video controller 24, the display data transmitter 26, the first selection switch 12A, the AD converter 14, and the TMDS signal receiver 16, so that a switching operation of the signal driving voltage switch 66A is controlled by the main controller 80. The light driving voltage switch 66B selectively cuts off LDVs that are to be supplied to the second selection switch 12B, the brightness adjustor 44, the light emission controller 50, the main controller 80, and the non-contact key input unit 70 depending on an operating mode of the display system. At this point, the LDVs are cut off by the light driving voltage switch 66C only when the display system operates in the power-off mode, so that the LDVs are not supplied to the second selection switch 12B, the brightness adjustor 44, the light emission controller 50, the main controller 80, and the non-contact key input unit 70.

The standby voltage switch 66C is driven in a complementary manner with the light driving voltage switch 66B to selectively cut off SBVs that are to be supplied from the DC power converter 62 to the main controller 80 and the non-contact key input unit 70 to allow the SBVs to be supplied to the main controller 80 and the non-contact key input unit 70 only when the display system operates in the power-off mode. In other words, the SBV and the LDV are supplied to the non-contact key input unit 70 and the main controller 80 in turns, and the switching operation of the light driving voltage switch 66B and the standby voltage switch 66C is controlled by the main controller 80.

Also, a regulator (not shown) for maintaining a voltage level constant may be connected between the DC power converter 62 and each of the standby voltage switch 66C, the signal driving voltage switch 66A, and the light driving voltage switch 66B.

The non-contact key input unit 70 illustrated in the display system of FIG. 1 supplies an approaching detection signal of a predetermined logic (e.g., a low logic) to the main controller 80 whenever a portion of the user s body (e.g., finger and/or hand) or other objects approaches the non-contact key input unit 70. The non-contact key input unit 70 includes an approaching detection sensor.

That is, the approaching detection signal generated from the non-contact key input unit 70 contains a power-on command or a power-off command the user wishes to input. Then, the main controller 80 inspects a section of the predetermined logic of the key detection signal to recognize the command (power-on or power-off command) input by the user. At the same time, the main controller 80 inspects a logic state of the key detection signal from the non-contact key input unit 70 to detect if there is an error (approaching detection error) in the key detection signal. If there is an error in the key detection signal, the main controller 80 controls the light emission controller 50 so that the light emission controller 50 controls the LED unit 420 of the light emission unit 40 such that the LED unit 420 emits light in a predetermined light emitting pattern letting the user know that there is an error in the non-contact key input unit 70. A method for controlling the display by determining the power-on and power-off commands in response to the key detection signal from the non-contact key input unit 70 will be described in more detail with reference to FIG. 4 later.

The main controller 80 inputs synchronization signals from the second selection switch 12B in addition to the key detection signal from the non-contact key input unit 70. The main controller 80 determines a current operating mode of the display system depending on whether the approaching detection signal includes a power-on command or a power-off command, and whether there is a synchronization signal from the second selection switch 12B. For example, when it is assumed that the start mode of the display system is generally divided into a power-on mode and a power-off mode and the power-on mode is further divided into a normal mode and a power-saving mode (i.e., DPM mode) or into a start mode, a normal mode, and a power-saving mode, the main controller 80 determines a current start mode (power-on mode or power-off mode) of the display system. When it is determined that the current start mode of the display system is the power-on mode, the main control unit 80 determines if the display system is in the normal or power-saving mode depending on whether there is a synchronization signal or if the display system is in the start, normal, or power-saving mode depending on there is a synchronization signal and on the base of a time at which the display system enters into the power-on mode. In order to drive the display system in the start mode determined based on the key detection signal and the synchronization signal, the main controller 80 controls the power cut-off operation of the power source unit 60 (i.e., the module driving voltage generator 64, the signal driving voltage switch 66A, the light driving voltage switch 66B, and the standby voltage switch 66C) for supplying driving voltages to the circuits within the display system. Also, the main controller 80 transmits a light-emitting mode command corresponding to the determined operating mode of the display system to the light emission controller 50, so that the light emission controller 50 allows the LED unit 42 of the light emission unit 40 to emit light in a light emitting pattern corresponding to the determined operating mode of the display system. In addition to the above-described controls, the main controller 80 controls the video controller 24 to process video signals as well as controls a selecting operation of the first and second selection switches 12A and 12B.

To control an operation of the display system as described above, the main controller 80 includes a processor (i.e., a central process unit or micro-computer) having an operation function. Also, the main controller including the processor can realize the brightness adjustor 44 using a program. In this case, the main controller 80, like the switch element included in the brightness adjustor 44, receives a key detection signal corresponding to the user's brightness designation level from the non-contact key input unit 70 and controls the light emission controller 50 in response to the input key detection signal.

Figure 3:
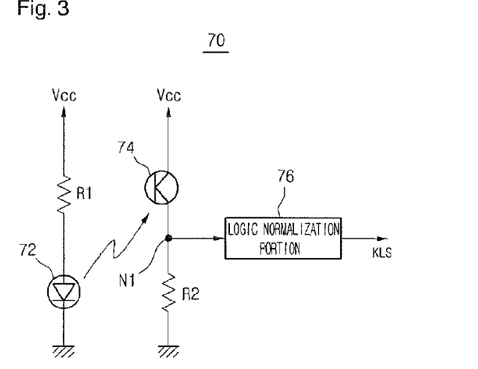
FIG. 3 is a detailed circuit diagram of a non-contact key input unit illustrated in FIG. 1 according to an embodiment of the present invention.

FIG. 3 is a detailed circuit diagram of the non-contact key input unit 70 according to an embodiment of the present invention.

Referring to FIG. 3, the non-contact key input unit 70 includes a series circuit formed of a first resistor R1 and an infrared diode that are connected between a high potential power source Vcc and a low potential power source GND and a series circuit formed of an infrared transistor 74 and a second resistor R2 that are connected between the high potential power source Vcc and the low potential power source GND. The infrared diode 72 and the infrared diode 74 are disposed opposing one another on a front portion of the display system so that the user can easily approach. The infrared diode 72 transmits the infrared rays to the infrared transistor 74 using a high potential voltage applied via the first resistor R1. When receiving the infrared rays from the infrared diode 72, the infrared transistor 74 has a low resistance and thus an approaching detection signal higher than a threshold logic voltage is transmitted from a first node N1 to a logic normalization portion 44. On the other hand, when the infrared rays traveling from the infrared diode 72 to the infrared transistor 74 are blocked by a portion of the user body, the infrared transistor 74 has a high resistance and thus an approaching detecting signal lower than the threshold logic voltage is transmitted from the first node N1 to the logic normalization portion 76. The logic normalization portion 76 generates a key detection signal having a high logic when the approaching detecting signal from the first node N1 between the infrared transistor 74 and the second resistor R2 is higher than the logic voltage. On the other hand, the logic normalization portion 76 generates a key detection signal having a low logic when the approaching detecting signal from the first node N1 between the infrared transistor 74 and the second resistor R2 is lower than the logic voltage. The key detection signal generated from the logic normalization portion 76 is transmitted to the main controller 80 illustrated in FIG. 1.

Figure 4:
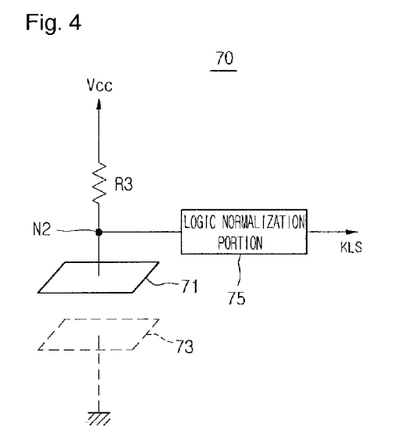
FIG. 4 is a detailed circuit diagram of a not-contact key input unit illustrated in FIG. 1 according to another embodiment of the present invention.

FIG. 4 is a detailed circuit diagram of a non-contact key input unit according to another embodiment of the present invention.

Referring to FIG. 4, a not-contact key input unit 70 of this embodiment includes a third resistor R3 connected between a high potential power source Vcc and a second node N2 and a conductive plate 71 connected to the second node N2. The conductive plate 71 is surface-charged with Electric charges by a high potential voltage applied via the third resistor R3 and the second node N2. An imaginary conductive plate 73 may disposed facing the conductive plate 71. The imaginary conductive plate 73 illustrated in FIG. 4 may be the user body or other conductive objects. When the user body or the conductive object approaches the conductive plate 71, the user body or the conductive object functions as the imaginary conductive plate 71 that allow the electric charges charged in the conductive plate 73 to flow toward the low potential power source GND and thus an approaching detecting signal lower than the threshold logic voltage is generated on the second node N2. On the other hand, when the user body or the conductive object moves away from the conductive plate 71, the electric charges are charged on the conductive plate 71 and thus an approaching detecting signal higher than the threshold logic voltage is generated on the second node N2. As a result, the approaching detection signal generated on the second node N2 depends on whether the electric charges of the conductive plate 71 is discharged or not. The logic normalization portion 75 receiving the approaching detection signal generates a key detection signal of a high or low logic in accordance with whether the approaching detection signal is higher or lower than the threshold logic voltage. When the approaching detection signal is lower than the threshold logic voltage, the key detection signal has the low logic. When the approaching detection signal is higher than the threshold logic voltage, the key detection signal has the high logic. The generated key detection signal is transmitted to the main controller 80 illustrated in FIG. 1.

Figure 5:
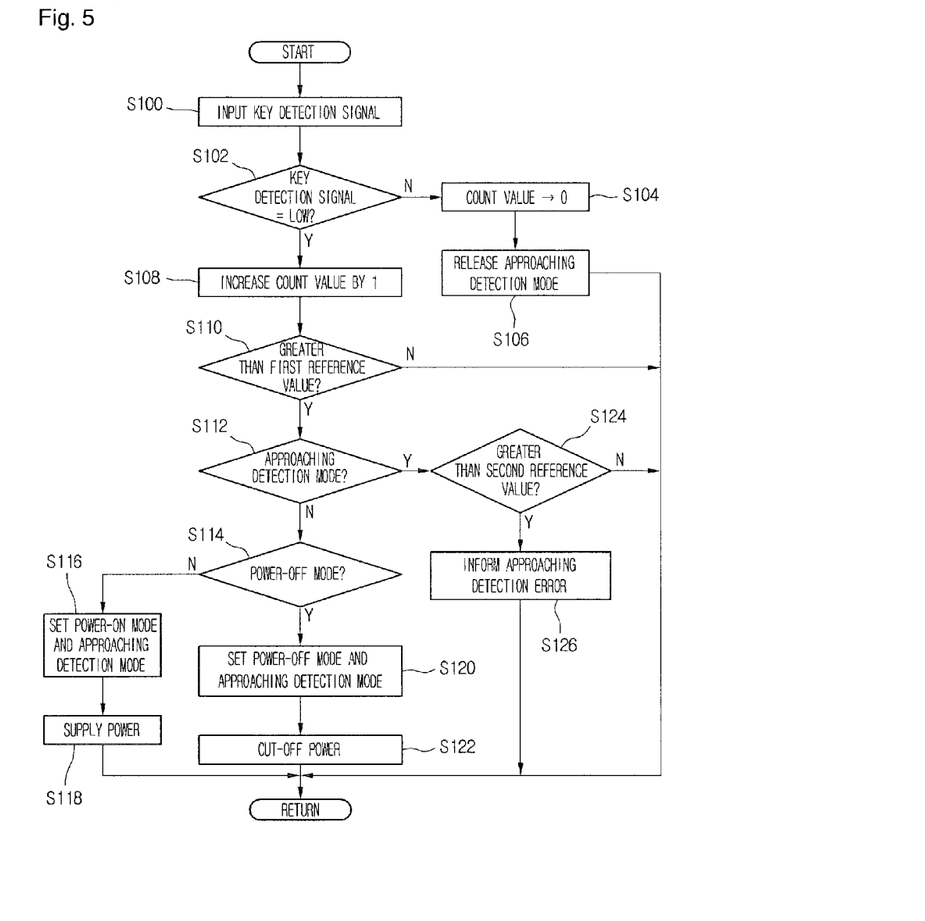
FIG. 5 is a flowchart of a method for controlling power of a display system according to an embodiment of the present invention.

FIG. 5 is a flowchart of a method for controlling power of a display system according to an embodiment of the present invention. The control is performed by the main controller 80 illustrated in FIG. 1. Therefore, the control method of FIG. 5 will be explained in conjunction with FIG. 1.

The main controller 80 inputs a key detection signal to the non-contact key input unit 70 at every predetermined period (S100). The main controller 80 determines if the input key detection signal has a low logic (S102). At this point, when it is determined that the key input signal has the low logic, the main controller 80 determines that there is a power-on or power-off command by the approach of a user body or an object. On the other hand, when the key detection signal has a high logic, the main controller 80 determines that the power-on and power-off commands are not input.

When it is determined in Step S102 that the key detection signal is the high logic, the main controller 80 resets a counter assigned to one of registers thereof so that the count value of the counter becomes zero (S104). In addition, the main controller 80 further resets an approaching detection mode flag assigned to another one of the registers so that a logic value of the flag becomes zero (S106). Next, the control process of the main controller 80 is returned to Step S100.

When it is determined in Step S102 that the key detection signal is a low logic, the count value increases by 1 (S108) and determines if the count value is greater than a first reference value (S110). At this point, when the count value of a low logic interval is less than the first reference value, the main controller 80 ignores the key detection signal by regarding the same as noise. On the other hand, when the count value of a low logic interval is greater than the first reference value, the main controller 80 determines that there is a power-on or power-off command. When the count value of a low logic interval is less than the first reference value, the control process of the main controller is returned to Step S100.

When the count value of a low logic interval is greater than the first reference value, the main controller 80 detects a logic value of the approaching detecting mode flag to determine if the approaching detecting mode is set (S112). At this point, when the logic value of the approaching detection mode flag is set as 1, the main controller 80 determines that the approaching detection mode is set. On the other hand, when the logic value of the approaching detection mode flag is reset as 0, the main controller 80 determines that the approaching detection mode is not set.

When it is determined in Step S112 that the approaching detection mode flag is reset, the main controller 80 detects a logic value of a power mode flag assigned to another one of the registers thereof to determine if the display system is in the power-off mode (S114). At this point, when the logic value of the power mode flag is 1, the main controller regards a former start mode of the display system was the power-on mode and determines that the key detection signal includes the power-off command input by the user. On the other hand, the logic value of the power mode flag is 0, the main controller regards a former start mode of the display system was the power-off mode and determines that the key detection signal includes the power-on command input by the user.

When it is determined in S114 that the logic value of the power mode flag is 0, the main controller 80 resets the power mode flag so that the logic value thereof becomes 1 and sets the power-on mode, and at the same time, resets the approaching detection mode flag to 1 to set the approaching detection mode (S116). Next, the main controller 80 controls the power source unit 60 such that the power source unit 60 supplies driving voltages required for driving the display system (S118). Then, the power source unit 60 supplies driving voltages SDV, MDV, and LDV to the signal input unit 10, the signal processor 20, the LCD module 30, the light emission unit 40, and the light emission control unit 50 so that an image corresponding to the video signal (video data) can be displayed.

When it is determined in S114 that the logic value of the power mode flag is 1, the main controller 80 resets the power mode flag so that the logic value thereof becomes 0 and sets the power-off mode, and at the same time, resets the approaching detection mode flag to 1 to set the approaching detection mode (S120). Next, the main controller 80 controls the power source unit 60 such that the power supply from the power source unit 60 is cut-off S122). Then, the power source unit 60 cuts off the driving voltages SDV, MDV, and LDV supplied to the signal input unit 10, the signal processor 20, the LCD module 30, the light emission unit 40, and the light emission control unit 50 so that an image corresponding to the video signal (video data) cannot be displayed. In this case, the power source unit 60 supplies a standby voltage SBV to the main controller 80 and the non-contact key input unit 70.

When it is determined in S114 that the logic value of the power mode flag is 1, the main controller 80 compares the count value of the low logic interval of the key detection signal with a second reference value higher than the first reference value (S124). A difference between the first and second reference values means an allowable error range within which the approaching detection operation is normally performed. Therefore, when it is determined that the count value of the low logic interval of the key detection signal is less than the second reference value but greater than the first reference value, the main controller 80 returns to Step S100. On the other hand, when it is determined that the count value of the low logic interval of the key detection signal is greater than the second reference value, the main controller determines that there is an approaching detection error caused by a human body or object approached and neglected between the infrared diode 40 and the infrared transistor 42. In this case, the main controller 80 generates a light emission mode command having a logic value corresponding to the error informing mode command and transmits the light emission mode command of the error informing mode command to the light emission controller 50. Then, the light emission controller 50 controls the LED unit 42 of the light emission unit 40 such that the LED unit 42 emits light with a light emitting pattern that is different from those in the power-off mode, the start mode, the normal mode, and the power-saving mode.

The following will describe application examples of a display system to which the above-described power control method can be applied.

Figure 6:
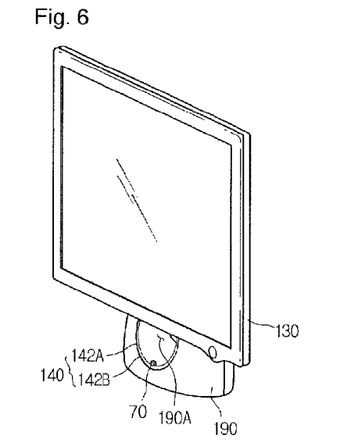
FIG. 6 is a perspective view of a display system according to an embodiment of the present invention.

FIG. 6 is a perspective view of a display system according to an embodiment of the present invention.

In the display system of FIG. 6, a display panel 130 is supported to be capable of rotating within a predetermined angle range by a support stand 190, and a through hole 190A is formed in a center of the support stand 190. A through hole 190A is formed through a center of the support stand 190. The through hole 190A is sized to allow a user hand to pass therethrough.

The LED unit 42 of FIG. 1 is installed in the through hole 190A of the support stand 190, and the LED unit 42 includes a cylindrical reflective body 142B prepared on a wall surface of the through hole 190A, and a circular LED array 142A installed in a front edge of the reflective body 142B. The LED array 142A is turned off or emit light in various patterns under the control of the light emission controller 50 illustrated in FIG. 1.

The cylindrical reflective body 142B is formed to have a structure generating an indirect lighting effect by reflecting light from the LED array 142A. The cylindrical reflective body 142B may include at least one color thin film. Further, the through hole 190A and the cylindrical reflective body 142B are formed to have inclination such that a diameter of the through hole 190A and the cylindrical reflective body 142B reduces along a portion from a front edge to a rear edge, so that a lighting effect is enhanced even more.

Also, the cylindrical reflective body 142B may be replaced by a cylindrical color filter suitable for transmitting and scattering light of a predetermined color. It is desirable that this cylindrical color filter is formed to have inclination together with the through hole 190A such that a diameter of the through hole 190A and the cylindrical color filter reduces along a portion from a front edge to a rear edge.

Meanwhile, the non-contact key input unit 70 is provided near the through hole 190A. That is, the non-contact key input unit 70 is provided on an inner circumference or an inlet portion of the through hole 190A so that, when the user inserts his/her hand into the through hole 190A, the non-contact key input unit 70 detects this to control the power as described above.

As described above, as the non-contact key input unit 70 is formed on the inner circumference of the through hole 190A, the manipulation of the display device can be more accurately realized only when an outer object such as the user hand is inserted into the through hole 190A.

Figure 7:
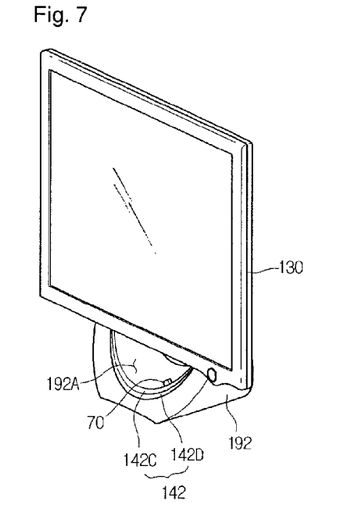
FIG. 7 is a perspective view of a display system according to another embodiment of the present invention.

FIG. 7 is a perspective view of a display system according to another embodiment of the present invention.

The display system of FIG. 7 includes a ring-type stand 192 supporting an LCD module 130 such that the LCD module 130 is rotatable in a predetermined angle range. The LED unit 42 of FIG. 1 is installed in a through hole 192A formed in the ring-type stand 192.

The LED unit 42 includes a ring-type reflective layer 142D prepared on a wall surface of the through hole 192A, and a circular LED array 142C installed in a rear edge of the reflective layer 142D. When seen from a front side, the LED array 142C allows a light effect of a solar eclipse represented when the sun is shielded by the moon to appear, and the reflective layer 142D enhances the lighting effect of the solar eclipse even more.

The reflective layer 142D may be replaced by a color filter suitable for transmitting and scattering light of a predetermined color, and the circular LED array 142C may be replaced by an arc-shaped LED array on a lower surface of the support stand. Also in this case, a lighting effect of a solar eclipse is realized.

In this embodiment, the non-contact type key input unit 70 is provided near the through hole 192A so that user can more effectively control the power of the display system.

Figure 8:
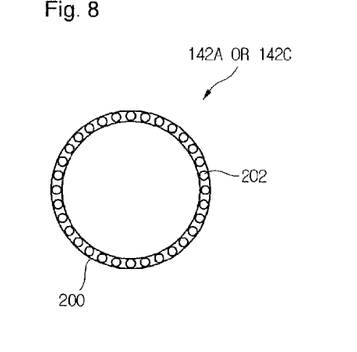
FIG. 8 is a detailed view explaining an array of LEDs illustrated in FIGS. 6 and 7.

FIG. 8 is a detailed view illustrating the LED arrays 142A and 142C of FIGS. 6 and 7.

Referring to FIG. 8, the LED array 142A, 142C includes LEDs 202 arranged with a constant interval in an inside of a ring-type transparent member 200, and the LEDs 202 are individually operated by the light emission controller 50 of FIG. 1.

Also, each LED 202 emits light at brightness controlled by a PWM signal, a current signal, or a voltage signal from the light emission controller 50. The LEDs 202 may be replaced by light-emitting devices such as cold cathode fluorescent lamps (CCFL) and incandescent lamps.

Figure 9:
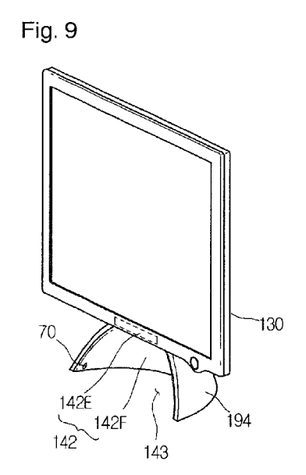
FIG. 9 is a perspective view of a display system according to another embodiment of the present invention.

FIG. 9 is a perspective view of a display system according to another embodiment of the present invention.

In the display system of FIG. 9, an LCD module 130 is supported to be rotatable within a predetermined angle range by a support stand 194 having a semi-pot shape. The semi-pot shaped support stand 194 is installed such that a concave inner surface 143 of the support stand 94 faces the same direction as that of a front side of the LCD module 130.

The LED unit 142 is installed in the semi-pot shaped support stand 194 and the LCD module 130, so that the LED unit 42 includes a light reflection plate 142F installed on an inner surface of the semi-pot shaped support stand 194, and an LED package 142E installed in a center at a rear lower end of the LCD module 130.

The LED package 142E is driven by a PWM signal, a current signal, or a voltage signal from the light emission controller 50 of FIG. 1 and emit light at brightness controlled by one of these signals.

The LED package 142E is installed in the center at the rear lower end of the LCD module 130 so that emitted light can be illuminated onto the light reflection plate 142F. The light reflection plate 142F reflects light from the LED package 142E to generate a lighting effect, so that the user can experience a pleasant and comfortable atmosphere.

Also, at least one color thin film can be provided on a surface of the light reflection plate 142F to enhance such a lighting effect. For another embodiment, the LED package 142E may be installed on a lower surface of the LCD module 130 so that light can be illuminated onto the light reflection plate 142F.

Figure 10:
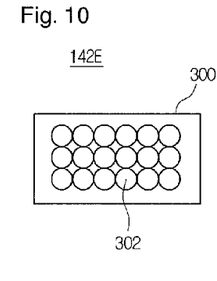
FIG. 10 is a detailed view of an LED package illustrated in FIG. 9.

FIG. 10 is a detailed view illustrating the LED package of FIG. 9.

The LED package 142E will be described with reference to FIG. 10. The LED package 142E includes LEDs 302 arranged to be adjacent to one another on a substrate 300, and these LEDs 302 are individually driven by the light emission controller 50 illustrated in FIG. 1. Each of the LEDs 302 emits light at brightness controlled in response to a PWM signal, a current signal, or a voltage signal from the light emission controller 50. The LEDs 302 can be replaced by light-emitting devices such as cold cathode fluorescent lamps (CCFL) and incandescent lamps.

In this embodiment, the non-contact type key input unit 70 is provided on the concaved surface of the support stand so that the user can more effectively control the power of the display system by inserting his/her hand into the concaved portion.

As described above, the support stand is provided with the through hole 190A or 192A or concaved portion 143 on which the non-contact key input unit 70 is installed such that the detection of the external object is realized on when the external object inserted into the into the through hole 190A or 192A or concaved portion 143. Therefore, the user can more effectively control the power of the display system by inserting his/her hand into the through hole or the concaved portion. That is, a pre-determined space is defined as a power control space of the display system by the user and the power control is realized only when the user inserts his/her hand into the power control space. As a result, the user can more effectively control the power of the display system.

In order to prevent the power control error caused by an unintentional insertion of the external objects into the space in which the non-contact key input unit 70 is installed, the space is isolated from an external side of the support stand. For example, the space is provided in the form of the through hole or the concaved portion to reduce the control error of the display system.

Furthermore, the through hole may be sized to allow only a finger to pass therethrough. In this case, the control error may be further reduced.

As described above, the display system and the power control method thereof according to the present invention can distinguish between the noise component and the normal power-on/off command depending on the time period of the approaching of the external object. Therefore, the power-on/off command can be accurately input by the user through a non-contact manner. In addition, the error information of the erroneous power-on/off command can be effectively transmitted using a light emitting pattern of the light emission unit.

The user manipulation intent can be accurately transmitted without error.

It will be apparent to those skilled in the art that various modifications and variations can be made in the present invention. Thus, it is intended that the present invention covers the modifications and variations of this invention provided they come within the scope of the appended claims and their equivalents.

INDUSTRIAL APPLICABILITY

The present invention is applicable to an image display apparatus such as a monitor and a television.

The invention claimed is:

1. A display system comprising:
    a display for displaying an image;
    a support to support the display;
    a detector coupled to the support to detect an approach of an object;
    a controller to control the power source based on one or more predetermined commands corresponding to one or more detection signals from the detector;
    a light emitter to emit a plurality of light emitting patterns, wherein the light emitter is provided on the support of the display; and
    a power source to provide power to at least one of the display, the detector, the controller or the light emitter, wherein the light emitter emits a different one of the light emitting patterns for different operating modes of the display, the modes of the display including:
    (a) a start mode when a power-on-mode command is inputted based on a first detection signal from the detector,
    (b) a normal mode when the power-on command is inputted and at least one of a synchronization signal or a color signal is inputted,
    (c) a power-saving mode when the power-on command is inputted and at least one of the synchronization signal or the color signal is not inputted,
    (d) a power-off mode when a power-off command is inputted based on a second detection signal from the detector, and
    (e) an error informing mode when a count value of a low logic interval of a third detection signal from the detector is greater than a first and second reference values,
    wherein the error informing mode is generated when an error detection is recognized for one of the power-on or power-off commands.

2. The display system according to claim 1, wherein the detector includes a non-contact key input detector.

3. The display system according to claim 1, wherein the support includes a recessed space and wherein the detector detects approach of the object when the object moves toward or enters the recessed space in the support.

4. The display system according to claim 3, wherein the recessed space is defined by a through hole horizontally penetrating the support.

5. The display system according to claim 3, wherein the space is defined by a concaved portion concaved rearward of the support.

6. The display system according to claim 1, wherein the object is a part of a human body or other objects.

7. The display system according to claim 1, wherein the controller controls the power source after removing a noise component using a predetermined logic interval of the one or more detection signals.

8. The display system according to claim 1, wherein the light emitter includes at least two light sources to which driving voltages are applied from the power source.

9. The display system according to claim 1, wherein the detector includes:
    an approaching detector to detect approaching of the object; and
    a logic normalizer to generate the one or more detection signals by normalizing an output of the approaching detector.

10. The display system according to claim 1, wherein the approaching detector includes one of an infrared detection sensor or an electrostatic conductive plate.

11. The display system according to claim 1, wherein the controller controls the light emitter to sequentially emit predetermined ones of the plurality of light emitting patterns based on at least one of:
    a) corresponding changes in the operating modes of the display, or
    b) different ones of the detection signals.

12. The display system according to claim 11, wherein the predetermined ones of the light emitting patterns is less than all of the plurality of light emitting patterns.

13. The display system according to claim 1, wherein:
    the light emitter includes a plurality of light sources, and
    the controller independently controls individual ones of the plurality of light emitting sources to generate;
    (a) a first pattern emitted when the display operates in the start mode,
    (b) a second pattern emitted when the display operates in the power-off mode,
    (c) a third pattern emitted when the display operates in the error informing mode, and
    (d) a fourth pattern emitted when the display operates in the power-saving mode, wherein at least one of the first, second, third, or fourth patterns is emitted by the light emitter based on the one or more detection signals output from the detector.

14. The display system according to claim 13, wherein:
    the plurality of light sources are arranged in a predetermined pattern and emit light into a recess in the support, and
    the detector detects the object approaching toward or extending into the recess in the support.

15. The display system according to claim 14, wherein the predetermined pattern is a curved pattern and wherein the light sources extend in the curved pattern in vertical alignment with a screen of the display.

16. The display system according to claim 14, wherein the light sources are located in a housing of the display and project light into the recess in the support.

17. The display system according to claim 14, wherein the light sources are light emitting diodes, incandescent lamps, or cold cathode fluorescent lamps.

18. The display system according to claim 15, wherein the detector is coupled along the curved pattern of the light sources.

19. A method of controlling a power of a display system, the method comprising:
    recognizing one or more predetermined commands corresponding to one or more detection signals by a detector as an object approaches;

controlling a power source for supplying driving voltages to at least one of a display, a light emitter, a controller or the detector in accordance with the one or more recognized commands; and controlling the light emitter to emit a plurality of light emitting patterns, the light emitter being provided on a support of the display, wherein said controlling includes controlling the light emitter to emit different ones of the light emitting patterns for different operating modes of the display, wherein the operating modes of the display include:
(a) start mode when a power-on command is inputted based on a first detection signal from the detector,
(b) a normal mode when the power-on command is inputted and at least one of a synchronization signal or a color signal is inputted,
(c) a power-saving mode when the power-on command is inputted and at least one of the synchronization signal or the color signal is not inputted,
(d) a power-off mode when a power-off command is inputted based on a second detection signal from the detector, and
(e) an error informing mode when a count value of a low logic interval of a third detection signal from the detector is greater than a first and second reference values, wherein the error informing mode is generated when an error detection is recognized for one of the power-on or power-off commands, and wherein the plurality, of light emitting patterns are emitted by the light emitter based on the operating modes of the display, respectively.

20. The method according to claim 19, wherein the object is a part of a human body.

21. The method according to claim 19, wherein one or more of the recognized commands includes at least one of the power-on command or the power-off command.

22. A display system comprising:
a display for displaying an image;
a support to support the display,
the support having a recess or an opening;
a detector to generate one or more detection signals based on detection of an object entering the recess or the opening of the support;
a controller, responsive to the one or more detection signals, to change an operating mode of the display to one or more corresponding prescribed states;
a plurality of light emitting devices configured to emit different light patterns corresponding to different ones of the prescribed states of the display; and
a power source to provide power to at least one of the display, the detector, the controller or the plurality of light emitting devices, wherein the operating modes of the display include:
(a) a start mode when a power-on-mode command is inputted based on a first detection signal from the detector,
(b) a normal mode when a power-on command is inputted and at least one of a synchronization signal or a color signal is inputted,
(c) a power-saving mode when the power-on command is inputted and at least one of the synchronization signal or the color signal is not inputted,
(d) a power-off mode when a power-off command is inputted based on a second detection signal from the detector, and
(e) an error informing mode when count value of a low logic interval of third detection signal from the detector is greater than a first and second reference value, wherein the error informing mode is generated when an error detection is recognized for one of the power-on or power-off commands, and wherein the different light patterns are emitted by the plurality of light emitting devices based on the operating modes of the display, respectively.

23. The display system according to claim 22, wherein the different light patterns include:
(a) a first pattern emitted when the display operates in the start mode,
(b) a second pattern emitted when the display operates in the power-off mode,
(c) a third pattern emitted when the display operates in the error informing mode, and
(d) a fourth pattern emitted when the display operates in the power saving mode, wherein the fourth pattern of the plurality of light emitting devices comprises a repeated emission of light at a brightness that reduces from a maximum level to a minimum level at a predetermined rate or increases from a minimum level to a maximum level at a predetermined rate, or a flickering emission of light at a predetermined rate.

* * * * *